May 3, 1966     W. A. HERPICH ET AL     3,249,243

REFUSE COLLECTING VEHICLE

Filed Jan. 18, 1965     4 Sheets-Sheet 1

INVENTORS:
WILLIAM A. HERPICH,
GEORGE W. PALMER,
JOHN G. SAND.

BY Owen & Owen
ATTORNEYS

May 3, 1966 W. A. HERPICH ET AL 3,249,243
REFUSE COLLECTING VEHICLE
Filed Jan. 18, 1965 4 Sheets-Sheet 2

INVENTORS:
WILLIAM A. HERPICH,
GEORGE W. PALMER,
JOHN G. SAND.
BY Owen & Owen
ATTORNEYS May 3, 1966 W. A. HERPICH ET AL 3,249,243
REFUSE COLLECTING VEHICLE
Filed Jan. 18, 1965 4 Sheets-Sheet 3
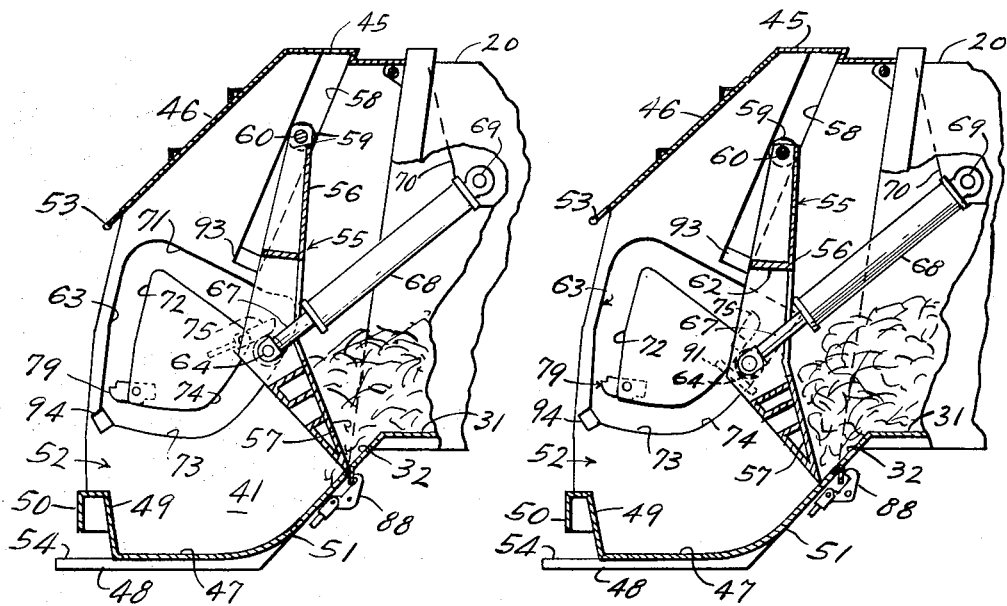
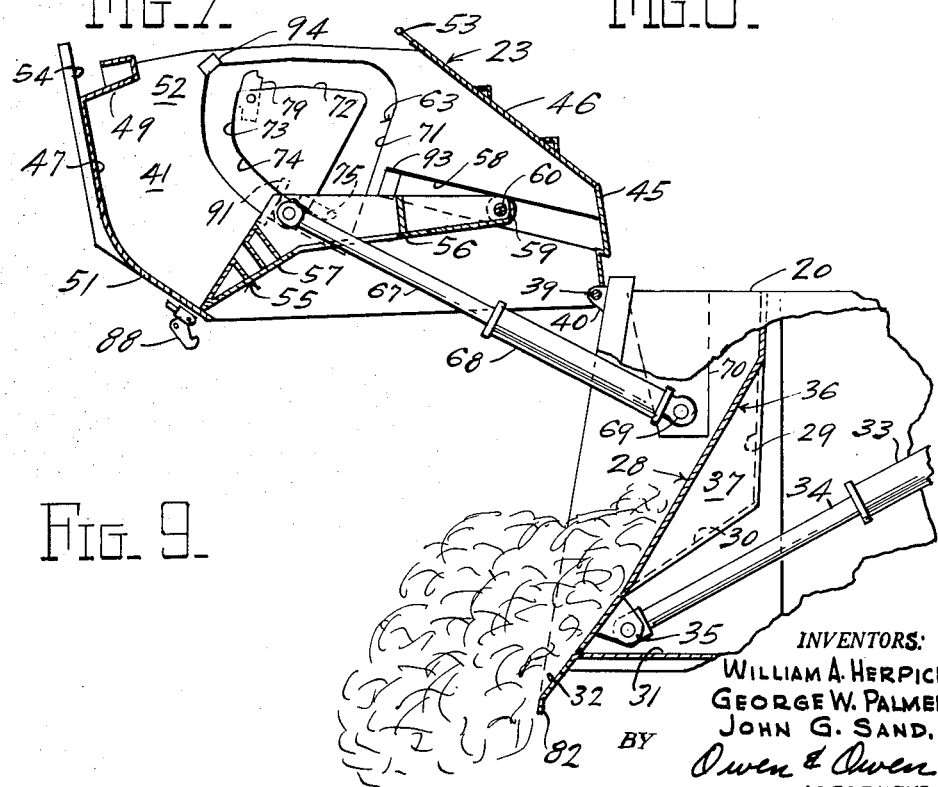
INVENTORS:
WILLIAM A. HERPICH
GEORGE W. PALMER
JOHN G. SAND.
BY Owen & Owen
ATTORNEYS

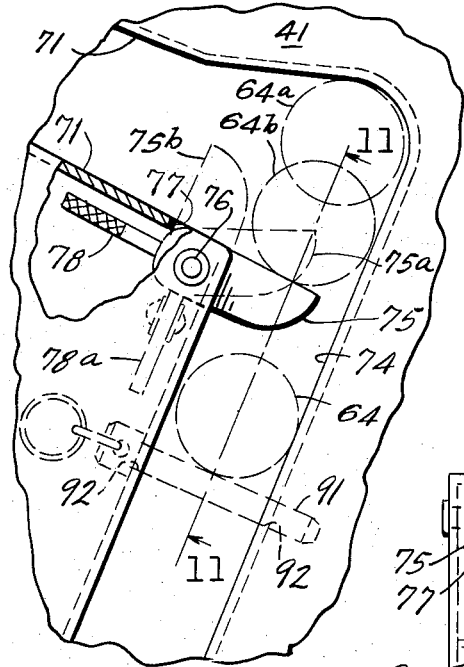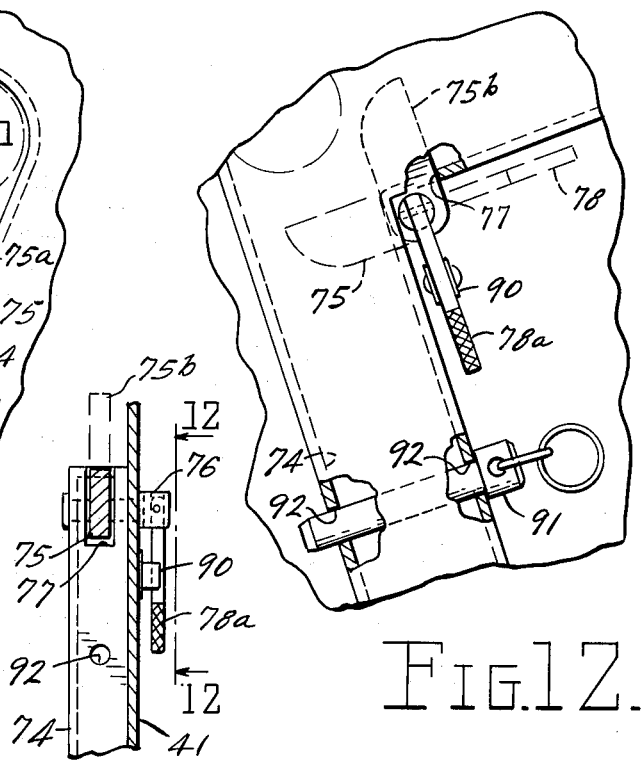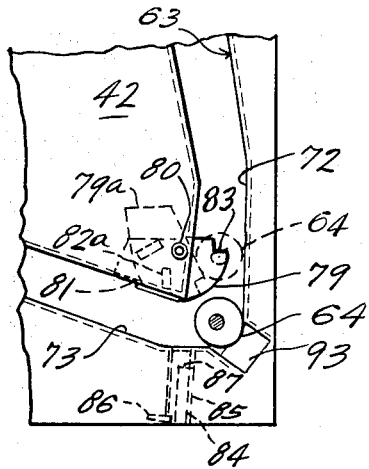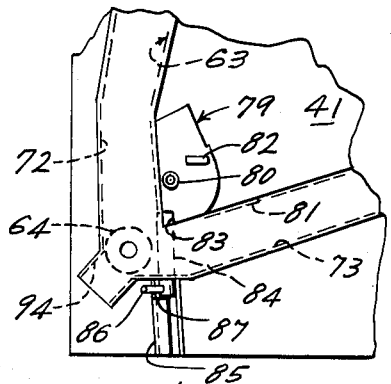

United States Patent Office 3,249,243
Patented May 3, 1966

3,249,243
REFUSE COLLECTING VEHICLE
William A. Herpich, George W. Palmer, and John George Sand, Galion, Ohio, assignors to Hercules Galion Products, Inc., Galion, Ohio, a corporation of Delaware
Filed Jan. 18, 1965, Ser. No. 426,289
8 Claims. (Cl. 214—83.3)

This invention relates to refuse collecting vehicles of the type customarily employed on city streets for the collection of trash, garbage, and other refuse from containers placed at the curbs of the streets. The application is a continuation-in-part of our co-pending application Serial No. 351,442 filed March 12, 1964.

Vehicles of this general type having hoppers at their rear ends are known and in some of these vehicles, at least, the hoppers and mechanisms for moving the refuse from the hoppers into the bodies of the vehicles are both contained in and supported by end gates which can be elevated out of the way for the discharge of the collected material from the bodies of the trucks. Some of these vehicles are of the dumping type wherein the body is tilted to dump the refuse after the tailgate has been opened, and others are of the ejection type in which an ejection plate is moved backwardly through the body for pushing the refuse out of the body after the tailgate has been opened. Many of these vehicles employ several sets of expensive hydraulic piston and cylinder arrangements in order to transfer refuse out of the receiving hoppers into the bodies of the vehicles, and others employ additional hydraulic piston and cylinder combinations in order to raise the tailgates up out of the way to permit the bodies to be tilted for dumping or to permit the ejection plates to be moved backwardly for ejecting the refuse out of the rear ends of the bodies. Because hydraulic piston and cylinder combinations are quite expensive, it is desirable that the number of such mechanisms employed should be reduced to a minimum.

Some vehicles which have been utilized for the above mentioned purpose have extremely complex mechanisms in their tailgates, including both liftable hoppers, packer blades, compacting blades, and complex linkages with the resulting requirement that the mechanism be equipped with various types of limit switches and other control means. All of these extra devices and accessories add cost to the vehicles and are liable to damage and result in malfunction.

Because it is difficult to adequately train the workers who load refuse into vehicles of this type to distinguish between those items of refuse which can adequately be handled by the vehicle and those which cannot, for example, bed springs, overstuffed chairs, and the like, those loading mechanisms which require the matching of moving ports in order to effect transfer of refuse from the hopper into the vehicle are very likely to be damaged during use.

It is therefore the principal object of the instant invention to provide a refuse collecting vehicle of the type generally described, wherein but a single moving part is utilized in order to effect movement of the refuse from the collecting hopper into the body of the vehicle.

It is another object of the instant invention to provide a refuse collecting vehicle of the rear end loading type wherein but a single set of hydraulic cylinders is employed for effecting transfer of the refuse from the collecting hopper into the body of the vehicle as well as the opening of the tailgate to permit expulsion of the collected refuse from the body of the vehicle.

It is yet another object of the instant invention to provide a refuse collecting vehicle having a rear end hopper wherein a single packer blade is employed for sweeping the refuse out of the hopper and for transferring it into the body of the vehicle without any additional mechanism being necessary in order to lift the refuse into position for engagement by the packer blade.

It is a still further object of the instant invention to provide a rear end loading type of refuse collecting vehicle wherein a single movable packer blade operates to sweep refuse out of a stationary hopper in the bottom of the tailgate of the vehicle and into the main body of the vehicle, effecting precompaction of refuse, for example, empty cardboard cartons, during the process of movement from the hopper into the vehicle body.

Another and more specific object of the instant invention is to provide a refuse collecting vehicle having a hopper on its rear end and a movable packer blade guided for movement through the hopper by a pair of tracks which define the path of excursion of the lower end of the packer blade and which have means for preventing inadvertent reversal of direction of movement of the blade and yet providing for such reversal of direction when desired.

These and other more specific objects and advantages of a refuse collecting vehicle embodying the invention will be better understood from the specification which follows and from the drawings in which:

FIGS. 4, 5, 6, 7 and 8 are all figures similar to FIG. 3 and show the refuse moving mechanism at several successive positions in its cycle of operation in order to effect the transfer of a quantity of refuse from the receiving hopper into the interior of the main body of the vehicle;

FIG. 9 is a view similar to FIGS. 3-8, inclusive, but illustrating how the tailgate of a vehicle embodying the invention is elevated out of the way so as to provide for the ejection of refuse from the main body of the vehicle;

FIG. 10 is a fragmentary view in elevation, shown on an enlarged scale, of details of one of an automatic gate means for a packer blade guide track;

FIG. 11 is a fragmentary, vertical sectional view taken along line 11—11 of FIG. 10;

FIG. 12 is a fragmentary view in elevation taken from the position indicated by the line 12—12 of FIG. 11;

FIG. 13 is a fragmentary view in elevation of a track gate which constitutes an improved feature in a refuse collecting vehicle embodying the invention, the view being taken from the interior of the tailgate; and FIG. 14 is a view similar to FIG. 13 but taken from the exterior of the tailgate.

Figure 1:
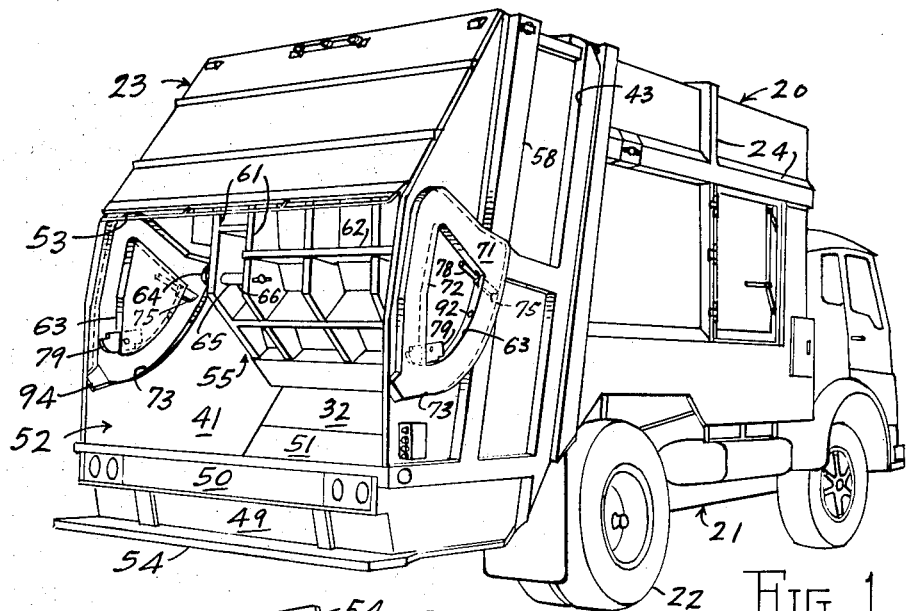
FIG. 1 is a rear quarter view in perspective of a refuse collecting vehicle embodying the invention, being shown with its refuse packer blade in position to retain the refuse within the main body of the vehicle and to provide for the emptying of refuse cans into a receiving hopper at the rear of the vehicle.

A refuse collecting vehicle embodying the invention has a hollow, generally rectangular body 20 mounted in conventional fashion upon a truck chassis, generally indicated by reference number 21, and overlying, in part at least, rear wheels 22 of the chassis 21. The vehicle has a tailgate, generally indicated by the reference number 23, and shown in down or "closed" position in FIG. 1 and in elevated or "open" position in FIG. 2. The body 20 preferably is fabricated from sheet metal forming an enclosure of rectangular, vertical cross section reinforced, for example, by external channels 24 and having an open rear end defined by box channels 25 along the vertical edges, a bottom cross frame 26 and a top cross frame 27.

Figure 2:
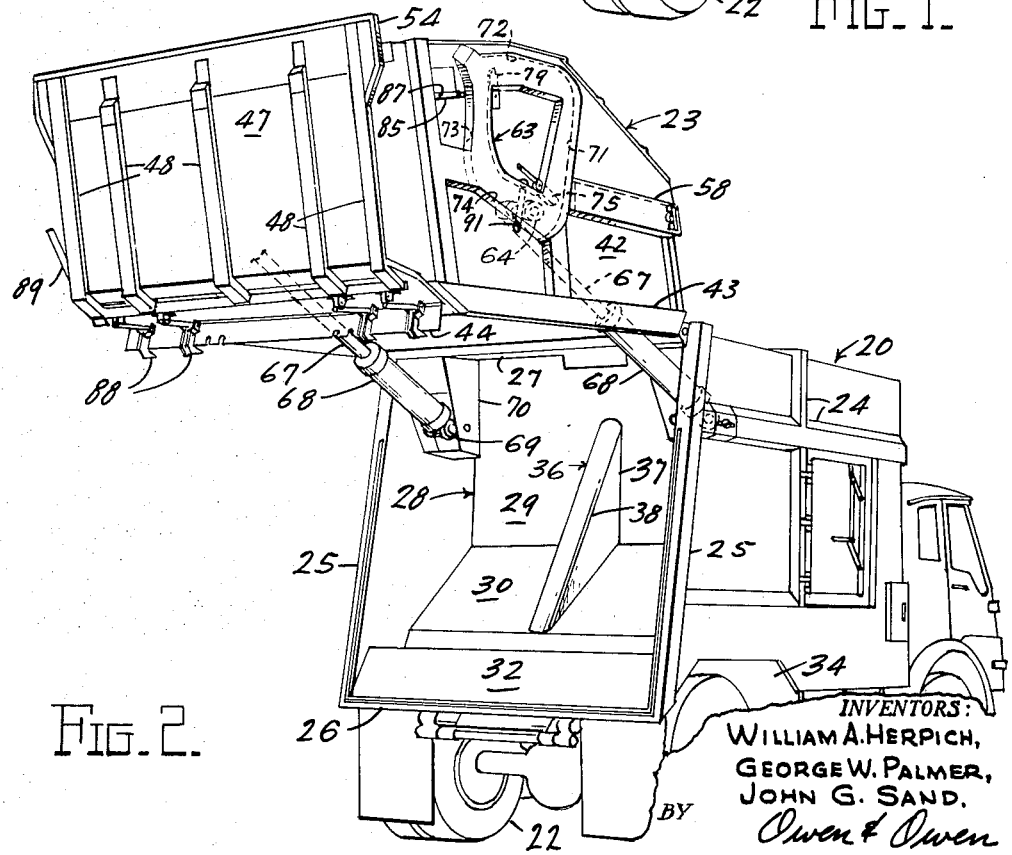
FIG. 2 is a view similar to FIG. 1 but showing the vehicle tailgate, which comprises the receiving hopper and the packing mechanism, swung upwardly out of the way so as to permit the ejection of refuse from the main body of the vehicle.

An ejection and precomposition plate 28 is slidingly mounted within the body 20 for movement from a position near the front of the body 20 to a rearmost position therein, illustrated in FIG. 9. The plate 28 is shown in FIG. 2 in a position spaced some six or eight inches forwardly of its rearmost position. The plate 28 comprises a vertically extending bulkhead 29 and a rearwardly extending incline 30. The ejection and precomposition plate 28 travels back and forth longitudinally within the body 20, being moved over a floor 31 thereof. The floor 31 terminates in a rear incline 32 leading to the bottom rear cross frame 26. A hydraulic cylinder 33 (FIG. 9) is pivotally connected at the center of the upper front corner of the top and front wall of the body 20 and has a rod 34 pivotally connected to a swivel member 35 at the center bottom of the ejection plate 28. A generally triangular enclosure 36, having spaced vertical walls 37 and a back wall 38, extends between the bulkhead 29 and incline 30 at the rear center of the ejection plate 28. The enclosure 36 is hollow in its interior and provides room into which the rod 34 and cylinder 33 swing when the ejection plate 28 is moved to the front of the body, as well as bracing the ejection plate bulkhead 29 and incline 30.

The entire tailgate 23, as a unit, is pivotally mounted at the upper rear corner of the body 20 by a pivot rod 39 (FIGS. 3 and following), which extends transversely across the body 20 and the tailgate 23, being engaged with a plurality of ears 40 welded or otherwise secured to the top cross frame 27 of the body 20 and several similar elements (not particularly shown) which are welded to the upper inner corner of the tailgate 23.

The tailgate 23 comprises opposed vertical and parallel sidewalls 41 and 42 that extend rearwardly from frame channels 43 which define the front vertical margins of the tailgate 23 and which lie adjacent the box channels 25 at the rear sides of the body 20 when the tailgate 23 is in its closed position. A bottom cross frame 44 (FIG. 2) of the tailgate 23 similarly lies adjacent the bottom cross frame 26 of the vehicle body 20 when the tailgate 23 is in its lowered position. The tailgate 23 has a generally flat top 45 (FIGS. 3–9) and a canopy 46 extending downwardly and rearwardly from the back edge of the top 45 and across between the upper rear, diagonally-cut corners of the sidewalls 41 and 42. The bottom of the tailgate 23 comprises a bottom plate 47 suitably strengthened by channels 48, an upwardly extending rear wall 49 having a return lip 50, and an upwardly and forwardly inclined front wall 51. The cross frame 44 is welded beneath and to the upper front edge of the inclined front wall 51 of the tailgate 23 and the front wall 51 is inclined at the same angle as the rear incline 32 of the floor 31 of the body 20 so that when the tailgate 23 is in closed position (FIGS. 1 and 3–8), the two are continuations of each other. The tailgate bottom plate 47, rear wall 49 and front wall 51 extend horizontally between the lower portions of the sidewalls 41 and 42 of the tailgate 23, forming a refuse receiving hopper, generally indicated by the reference number 52.

The lower, horizontal edge of the canopy 46, the upper horizontal edge of the junction between the rear wall 49 and lip 50, and the back edges of the sidewalls 41 and 42 define a large rectangular access opening into the tailgate 23 from the back of the vehicle. A handbar 53 (FIG. 1) is mounted across the rear, lower edge of the canopy 46 and a step 54 is supported on the rear ends of the channels 48 so that workers can ride along with the vehicle when it moves from place to place on a collection route.

A packer blade 55 is mounted for movement within the tailgate 23 for moving refuse out of the hopper 52 and into the interior of the body 20. The packer blade 55 extends all the way across the tailgate 23 between the sidewalls 41 and 42 thereof, and includes an upper, generally vertically extending section 56 and a lower, forwardly inclined section 57. The uppermost end of the packer blade 55 is guided during its cycle of operations by a pair of generally vertically extending tracks 58 (FIG. 3) which are fabricated from heavy sheet metal welded, for example, to the sidewalls 41 and 42 of the tailgate 23. At each of the upper, outer corners of the upper packer blade section 56, there is located a track engaging roller 59 which is rotatably mounted on the end of a horizontal stub rod 60, the stub rod 60 being fixedly secured in and extending through to adjacent reinforcing channels 61 (see FIG. 1) several of which extend from top to bottom of the packer blade 55 and are additionally braced by horizontal reinforcing channels 62.

The two vertical tracks 58 are parallel to each other so that engagement of the two rollers 59 in the tracks 58 guides the upper end of the packer blade 55 for vertical movement within the tailgate 23 with the packer blade 55 extending across the tailgate 23 perpendicular to its side walls 41 and 42.

The path of movement of the packer blade 55 during a packing excursion is guided by a pair of closed, four-sided tracks, generally indicated by the reference number 63. The two tracks 63 in the sidewalls 41 and 42 are identically spaced on opposite sides of the tailgate 23 and each of the tracks 63 guides a track roller 64 (FIG. 10), one of which is supported at each side of the packer blade 55 along the horizontal line of junction of its upper section 56 and lower section 57. Each of the track rollers 64 is rotatably mounted on the end of a stub rod 65, the stub rod 65 being fixed in and extending between the two vertical reinforcing channels 61 at each side of the packer blade 55. Each of the stub rods 65 also carries a trunnion 66 to which the end of one of a pair of piston rods 67 (FIGS. 3–9) is connected. The two piston rods 67 are movable in hydraulic cylinders 58, one at each side of the vehicle, and which cylinders 68 apply power to the packer blade 55 to carry it through its loading excursion as well as to effectuate opening of the tailgate 23 in a manner to be described below. The upper end of each of the cylinders 68 is pivotally mounted by a suitable support pin 69 which is carried, in turn, in one of a pair of heavy depending brackets 70 located at the upper, inner corners and near the rear of the body 20.

The closed four-sided tracks 63 in sidewalls 41 and 42 of the tailgate 23, have upwardly and rearwardly inclined legs 71 connected through arcs of relative small radius to generally vertically extending rear legs 72. The rear legs 72 extend downwardly, generally parallel to the rear edges of the respective sidewall 41 and 42 and terminate at a level above the bottom plate 47 of the tailgate 23 such that when the track rollers 64 reach the bottoms of the two legs 72 of the tracks 63, the bottommost edge of the packer blade 55 contacts the bottom plate 47. The tracks 63 also have forwardly extending bottom legs 73 which are generally parallel to the bottom plate 47 and which connect to front, upwardly inclined legs 74 of the tracks 63, the legs 74 intersecting the front ends of the legs 71 at their upper, forward ends. It will be observed in FIGS. 3–8, inclusive, that the top, rearwardly and upwardly inclined track legs 71 do not have parallel sidewalls as do the other three track legs 72, 73 and 74, but are wider at their front ends and at the junctions with the legs 74. The other three legs 72, 73 and 74 of the tracks 63 have sidewalls which are spaced a distance just slightly greater than the diameters of the rollers 64 which run in those tracks.

Figure 3:
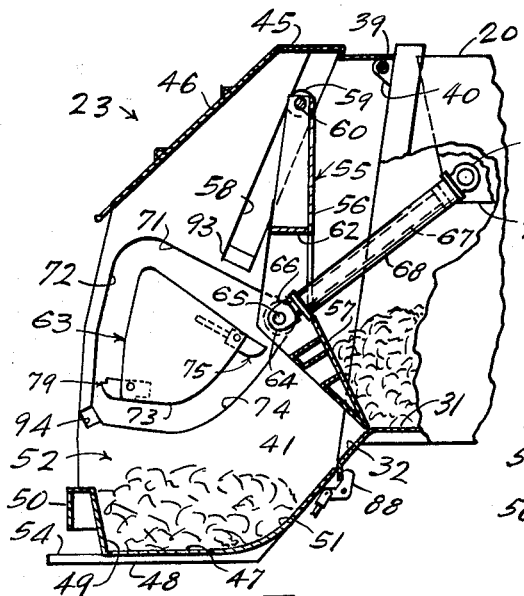
FIG. 3 is a fragmentary, diagrammatic view on a smaller scale, taken generally along a longitudinal vertical plane of the vehicle shown in FIG. 1, with the operative parts of the vehicle in the position also shown in FIG. 1.

In FIG. 3, the packer blade 55 is shown in the position which it occupies during the loading of refuse into the receiving hopper 52. It will be noted that the bottommost edge of the packer blade 55 is located inwardly of the body 20 beyond the front end of the front wall 51 of the tailgate 23, and at the line of intersection of the bottom of the body 20 with the upper corner of the rear incline 32. The position shown in FIG. 3 retains previously loaded refuse within the body 20 and prevents it from falling downwardly back into the hopper 52 during transit between collection locations or during intervals between actuation of the packer blade 55 while the workers are dumping refuse into the hopper 52 through the access opening at the rear of the tailgate 23.

Figure 4:
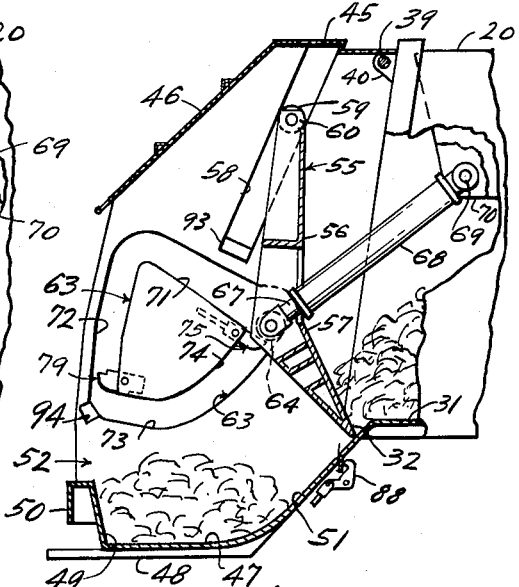
Figure 5:
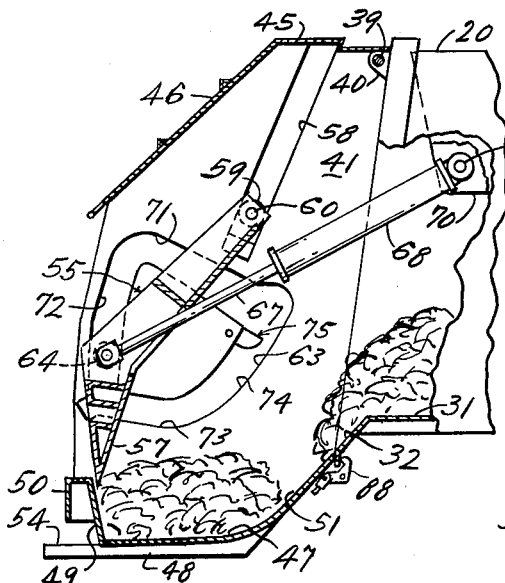
Figure 6:
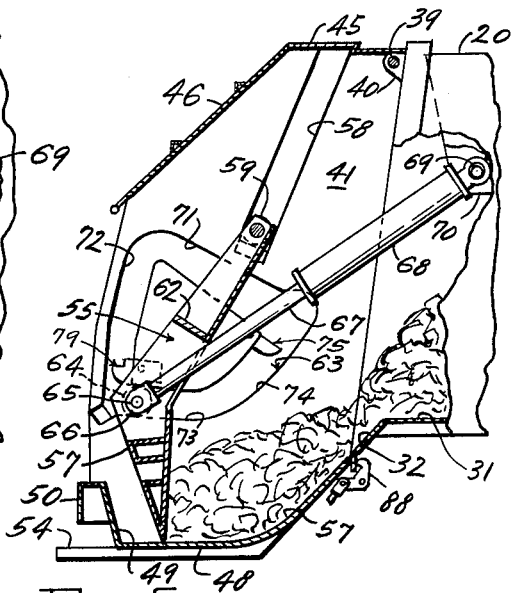

A normal loading excursion of the packer blade 55 consists of counterclockwise movement of its track rollers 64 around the respective closed tracks 63, progressing, in sequence, from the position shown in FIG. 3 through the position shown in FIGS. 4 and 5, to move the lower edge of the packer blade 55 backwardly over the mass of refuse in the hopper 52, downwardly to a position between FIGS. 5 and 6 so that the lower edge of the packer blade 55 slides down the inner side of the rear wall 49 and then forwardly and upwardly through the position illustrated in FIG. 7 to scoop the refuse upwardly out of the hopper 52 and into the body 20 and, finally, back to the position illustrated in FIG. 3.

Rearward movement of the packer blade 55 from the position illustrated in FIG. 3 is achieved by feeding oil under pressure to the cylinders 68 to extend their rods 67. However, because the track rollers 64 are located at the front upper corner of the intersection of the track legs 71 and 74, in this most forward position of the packer blade 55 (see FIG. 3), means must be provided to insure that upon the initial extension of the cylinder rods 67 and movement of the packer blade 55, it will be guided upwardly and rearwardly along the track legs 71 rather than downwardly and back along the track legs 74.

A track switch 75 (FIG. 10) is pivotally mounted at the upper front intersection of each of the track legs 74 and 71 by a pivot pin 76 and, in its normal position, extends substantially across the upper part of the track leg 74 in line to be engaged by the track roller 64 as it progresses up the track leg 74 to the upper forward position illustrated in FIG. 3. The track switch 75 extends through a slot 77 (FIG. 11) cut in the inner walls of the track legs 74 and 71 and the pin 76 protrudes through the side wall 41, for example, to the outer side of the tailgate 23 and has a handle 78 secured thereto. As the roller 64 progresses up the track leg 74 it first engages the inwardly protruding end of the switch 75 and swings it around (counterclockwise FIG. 10) through the intermediate position shown in dotted lines and indicated by the reference number 75a in FIG. 10 to the uppermost position also shown in dotted lines and indicated by the reference number 75b in FIGS. 10 and 11. The portion of inner wall of the track leg 71 which defines the rear of the slot 77 serves as a stop to prevent further counterclockwise movement of the switch 75 after it has reached the position 75b (see FIG 10). Immediately after the passage of the roller 64 beyond the track switch 75 in its position 75b, the roller 64 moves to the upper inner position indicated by the reference number 64a in FIG. 10 and gravity causes the track switch 75 to swing back downwardly to the position indicated in solid lines in FIG. 10. Further clockwise rotation of the switch 75 is prevented because the handle 78 engages the inner wall of the track leg 71, which serves as a stop. The position of the roller indicated by the reference number 64a in FIG. 10 is the rest or the traveling position shown in FIG. 3 of the drawings, with the packer blade 55 at the upper forward position.

At the beginning of the next excursion of the packer blade 55, the track roller 64 moves from the positions shown in dotted lines and indicated by the reference number 64a to the position also shown in dotted lines indicated by the reference number 64b in FIG. 10 where they strike the upper surface of the track switches 75. As the piston rods 67 continue to be extended out of their cylinders 68, because of the engagement of the rollers 64 with the track switches 75, the rollers 64 are deflected backwardly and up along the track legs 71 to commence the excursion of the packer blade 55 backwardly and over the refuse in the hopper, moving to the position illustrated in FIG. 5.

As the packer blade 55 approaches the rearward lower position i.e., when it reaches the position illustrated in FIG. 5, having moved vertically downward behind the change of refuse in the hopper 52, the track rollers 64 approach the intersection between the rear vertical track legs 72 and the rear lower end of the track legs 73. At this point, the track rollers 64 engage the inwardly protruding ends of track gates 79 (FIGS. 13 and 14).

Each of the track gates 79 is substantially semi-circular in shape, being cut from relatively heavy sheet steel, for example, and is pivotally mounted by a heavy pin 80 at the junction of the respective forward vertical track leg 72 and lower, generally horizontal extending, track leg 73. A slot 81 is cut through the horizontal surface of the inner sides of the track legs 72 and 73 at the intersection therebetween and the track gate 79 is pivotally mounted by the pin 80 to swing through the slot 81. A counterweight 82 (see FIG. 14) is secured on the outer surface of the gate 79 in such position as to urge the gate 79 into the solid line position in FIG. 13 and also to function as a stop for the gate 79 in that position, coming up against the outer surface of the inner sidewall of the vertical track leg 72, as illustrated in FIG. 13 and shown in dotted lines indicated by the reference number 82a.

When the packer blade 55 is moved downwardly with the rollers 64 moving along the vertical track legs 72, the rollers 64 engage the upper horizontal edges of the track gates 79, camming them downwardly (clockwise—FIG. 13) and displacing them outwardly from the vertical track legs 72, as shown in dotted lines in FIG. 13. After the track rollers 64 pass the track gates 79, the counterweights 82 swing the track gates 79 back into track obstructing position (counterclockwise—FIG. 13). Therefore, when the track rollers 64 reach the bottom of the intersections between the vertical track legs 72 and the horizontal track legs 73, and the hydraulic connections to the actuating cylinders 68 are reversed, it is impossible for the track rollers 64 to go back up the vertical track legs 72 and the continuation of the excursion of the packer blade 55 from that point forwardly through the tailgate 23 is assured.

If material is jammed in the lower part of the hopper 52 or, for some other reason the operator desires to traverse the packer blade 55 back upwardly from the rear lowermost position, i.e. to roll the track rollers 64 back up the vertical track legs 72, the track gates 79 can be swung out of the way, as illustrated in FIG. 14. It will be observed that at the rear upper corner of each of the track gates 79 there is cut a rectangular notch 83 which is aligned with the end of a bolt 84, shown in lower or inactive position in FIG. 13, and in upper or active position in FIG. 14. The bolt 84 slides in a slotted tube 85 positioned on the exterior of the respective tailgate sidewall 41 or 42 and accessible from the exterior of the vehicle. The bolt 84 has a handle 86 by which the operator may slide the bolt 84 vertically and which can be swung angularly and horizontally into a circumferential slot 87 cut in the tube 85 to lock the bolt 84 in its uppermost position.

As can best be seen in FIG. 14, the operator grasps the counterweight 82 and swings the track gate 79 into its uppermost position, placing the notch 83 in alignment with the bolt 84. If the gate 79 is not swung to its completely retracted position, when the operator slides the bolt 84 upwardly, it will not move high enough for the handle 86 to be swung horizontally into the slot 87. If, however, the operator has swung the track gate 79 into completely inoperatable position, the notch 83 is aligned with the end of the bolt 84 and the operator can lock the bolt 84 in its uppermost position and the track gate 79 in its retracted position, as illustrated in FIG. 14. In addition to locking the track gates 79 in their retracted position, the bolts 84 also extend across the lower rear ends of the horizontal track legs 73 and prevent the entry of the track rollers 64 into the track legs 73.

Under the circumstances just described, therefore, when the track rollers 64 reach the intersection of the ends of the track legs 72 and 73 and the operator disengages the automatic track gates 79 and bolts them into retracted position, as shown in FIG. 14, when the hydraulic connections to the actuating cylinders 68 are reversed, the packer blade 55 is moved upwardly from this position with the track rollers 64 running back up the track legs 72. This permits the operator to remove or disengage whatever material may have jammed the packer blade 55 in its lower rearmost position without risking damage to other parts of the mechanism which would result if it were necessary to carry the packer blade 55 forwardly through an excursion before the jam could be cleared.

After relieving the jam or cleaning away the material which is causing the trouble, the operator releases the bolts 84, dropping them into their lower position and allowing the automatic track gates 79 to swing back into operative position (FIG. 13) and then reverses the hydraulic connections to the actuating cylinders 68 to cause the packer blade 55 to move downwardly to the lower and rearmost position and thence, upon another reversal of such connections, to move forwardly along the lower track legs 73 for sweeping refuse out of the tailgate 23.

When the track rollers 64 reach the bottom intersection of the downwardly extending rear track legs 71 and the lower forwardly extending track legs 73, the packer blade 55 is inserted fully behind the load of refuse in the hopper 52 and, either after clearing a jam if one existed or in a routine cycle of operation, the controls to the cylinders 68 are reversed to retract their piston rods 65 and pull the packer blade 55 forwardly moving it along a path guided by the lower track legs 73 to sweep the refuse forwardly out of the hopper 52. The packer blade 55 moves from the position illustrated in FIG. 6 and toward the position illustrated in FIG. 7 as the track rollers 64 run up the forward track legs 74. It should also be observed, of course, that when the packer blade 55 is in the position illustrated in FIG. 6, its upper track rollers 59 are located at the bottom ends of the tracks 58. After the track rollers 64 have entered the upwardly and forwardly inclined front track legs 74, the upper track rollers 59 start to move upwardly in the generally vertical upper tracks 58.

The cycle is completed when the packer blade 55 and its associated parts return again to the position shown in FIG. 3 at which time suitable controls are actuated to relieve the hydraulic pressure on the cylinders 68 and to neutralize their controls for the initiation of a subsequent cycle.

During packing cycles as just described, the ejection plate 28, which travels back and forth in the body 20, is utilized for the purpose of precompacting refuse moved into the body 20 upon each actuation of the packer blade 55. For example, when the body 20 is empty, at the beginning of a route of refuse collection, the operator actuates suitable controls which extends the rod 34 out of its cylinder 33 to move the ejection and precompaction plate 28 backwardly in the body 20 to a position, say two or three feet from its rearmost position (FIG. 2). The ejection and precompaction plate 28 then forms a front bulkhead on the space into which the packer blade 55 feeds refuse. Oftentimes, refuse contains large bulky objects such as corrugated cardboard boxes, and the like, which occupy excessive space in the interior of the body 20 unless they are compacted or crushed during their movement into the body 20. The power of the two packer blade cylinders 68 is such that when the packer blade 55 is moved from the position shown in FIG. 7 to the position shown in FIG. 8 and thence to the position in FIG. 3, sufficient force is applied to crush corrugated cardboard boxes, flattening them out to eliminate the otherwise wasted space within the body 20. After a number of packing cycles of the packer blade 55 have been completed and when the operator's experience teaches him that the space between the rear side of the ejection plate 28 and the packer blade 55 is filled with the refuse in properly precompacted condition, he actuates the controls to draw the rod 34 somewhat into its cylinder 33 and thereby to move the ejection and precompaction plate 28 forwardly in the body 20. He stops it some two or three feet in front of its previous position to provide space behind the bulkhead for the movement of additional charges of refuse. During the entire travel of the refuse vehicle, the operator continues to move the ejection and precompaction plate 28 forwardly in suitable increments of travel after each set or series of refuse loading cycles of the packer blade 55.

During the collection of refuse, the tailgate 23 is held in its closed position by suitable latching means, for example, the latching means illustrated in FIG. 2, which comprises a series of latch fingers 88 engageable with the bottom cross frame 26 of the body 20. The latch fingers 88 are connected by suitable linkage to a release handle 89 on the outside of the tailgate (see FIG. 2).

Successive loads of refuse from the hopper 52 gradually fill the body 20 with the ejection plate 28 being moved forwardly until the refuse is so solidly packed that the body must be emptied. If the refuse is solidly packed, when the packer blade 55 reaches the position shown in FIG. 8, the pressure in the cylinders 68 reaches a level such that it opens a pressure relief valve (not shown) which is set at a value to prevent structural damage, and the packer blade movement stops. The pressure relief may be of any conventional type and is located in the hydraulic circuit leading to the cylinders 68. Cessation of movement of the packer blade 55 signals the operator that the body is fully loaded so he departs for the dump or other discharge location, such as an incinerator.

In order to elevate the tailgate 23, the operator inserts a pair of stops 91 through aligned holes 92 in the front and rear walls of the track legs 74, as shown in FIG. 12. However, prior to inserting the stops 91, the track rollers 64 are moved upwardly in the track legs 74 until they are above the aligned holes 92 (see FIG. 10).

If the track rollers 64 are in the position shown in solid lines in FIG. 10 wherein the track rollers 64 are above the aligned holes 92 but below the track switches 75, the operator merely inserts the stops 91 in the aligned holes 92. The track rollers 64 are then moved downwardly in the track legs 74 until they engage the stops 91.

If, however, the track rollers 64 have already moved upwardly in the track legs 74 and have passed the track switches 75 (dashed line position 64a), after inserting the stops 91 the operator swings the track switches 75 from the position shown in solid lines in FIGS. 10 and 11 and indicated by the reference number 75 in FIG. 12 to the position shown in dotted lines in FIGS. 10 and 11 indicated therein and in FIG. 12 by the reference number 75b. The track switches 75 are swung into these positions by grasping the handles 78 and swinging them downwardly, engaging each with a pair of holding fingers 90 which hold the track switches 75 in their positions 75b. When the track switches 75 are in this position the track rollers 64 can be moved downwardly from their upper inner position (64a in FIG. 10), down the track legs 74, until they engage the stops 91.

In either event, prior to elevating the tailgate 23 the operator must release the latch fingers 88. Continued actuation of the cylinders 68, with the hydraulic controls in a reverse setting, extends their piston rods 67 and, acting through the stops 91, swings the entire tailgate backwardly and upwardly to the position illustrated in FIG. 9, completely opening the rear end of the body 20. The operator then actuates controls to move the ejection plate 28 backwardly through the body 20 to its rear most position as shown in FIG. 9 which ejects all of the refuse from the body 20.

The operator then reverses the hydraulic controls to the two packer blade cylinders 68, withdrawing their rods 67, and lowering the tailgate 23 downwardly to its closed position. Continued retraction of the rods 67 from the position thus achieved (FIG. 8) back to the position illustrated in FIG. 3 restores the packer blade 55 to its rest position. The operator then withdraws the stops 91 from the track legs 74 and disengages the handles 78 from their retaining fingers 90 so that the track switches 75 swing back downwardly across the upper ends of the track legs 74 into normal operating position.

Because the packer blade 55 is guided at both of its upper edges by the rollers 59 and at both sides of its center by the rollers 64, which run in the respective vertical tracks 58 and lower closed tracks 63, the packer blade 55 is firmly guided during its movement through the tailgate and maintained "square" in the gate.

In order to minimize the jamming of articles of refuse in either the vertical tracks 58 or the closed tracks 63, each of the tracks 58 and 63 has a short inclined relief opening 93 or 94, as the case might be, which leads any refuse in the tracks 58 or 63, respectively, to the inner surface of the sidewalls 42 and 41, whence it drops into the refuse hopper 52.

What we claim is:

1. In a refuse collecting vehicle body including a tailgate having a loading hopper with parallel upwardly extending sidewalls, a receiving opening at the rear of said hopper and an opening into the body, the improvement comprising, a pair of opposed, multisided, guide tracks, one in each of said sidewalls, guide means on the ends of said packer blades engaged with said tracks, each of said tracks having an upper, generally horizontal, first leg for guiding said packer blade rearwardly over refuse in said hopper, a rear, generally vertical, second leg for guiding said packer blade into said hopper behind such refuse, a lower, generally horizontal, third leg for guiding said packer blade across the bottom of the hopper, a front, upwardly and forwardly extending, fourth leg for guiding said packer blade during movement of such refuse into said body, a track gate adjacent the intersection of said second leg and said third leg movable between a first position effective to prevent upward movement of said packer blade guide means in said second leg and a second position whereby said track gate is disabled and said packer blade guide means is free to move upwardly in said second leg, a track switch pivotally mounted adjacent the intersection of said first leg and said fourth leg, said track switch having a packer blade guide means engager openable by said packer blade guide means moving upwardly in said fourth leg and being effective to prevent movement of said packer blade guide means downwardly in said fourth leg from such intersection of said first leg and said fourth leg, locking means exterior of said hopper for retaining said guide means engager of said track switch in a disabling position whereby said packer blade guide means is free to move downwardly in said fourth leg from the intersection of said first leg and said fourth leg, power means for moving said packer blade around the path defined by said tracks and track stop means located in said fourth leg at a level beneath said track switch and movable between a track open position for normal operation and a track closed position effective to block downward movement of said packer blade guide means, whereby said power means may be energized to transmit power through said track stop means to said tailgate for swinging said tailgate around the pivotal mounting on said body.

2. In a refuse collecting vehicle body having a loading hopper with parallel upwardly extending sidewalls, a receiving opening at the rear of said hopper and an opening into the body at the front of said hopper, and having a unitary packer blade for moving refuse from said hopper into said body, the improvement comprising, a first pair of generally vertical guide tracks, one in each of said sidewalls, engaging means at the upper corners of said packer blade reciprocatably mounted in said vertical guide tracks, a second pair of parallel, multisided, closed, guide tracks spaced below said first pair of guide tracks, one in each of said sidewalls, guide means on the ends of said packer blade engaged with said tracks, each of said tracks having an upper, first leg extending generally horizontally for guiding said packer blade rearwardly over refuse in said hopper, a rear, second leg extending downwardly from said first leg for guiding said packer blade into said hopper behind such refuse, a track gate in said second leg that is located above the lower end thereof and that is openable by said guide means moving downwardly, for preventing movement of said packer blade guide means upwardly from the lowermost end of said second leg, a lower, third leg extending generally horizontally for guiding forward from said second leg said packer blade across the bottom of said hopper, a fourth leg extending upwardly and forwardly from said third leg at the beginning of said first leg for guiding said packer blade during movement of such refuse into said body, a track switch in said fourth leg that is located beneath the upper end thereof and that is openable by said guide means moving upwardly, for preventing movement of said packer blade guide means downwardly in said fourth leg from the upper forward intersection of said fourth and first legs, and power means for moving said packer blade around the path defined by said tracks.

3. Mechanism according to claim 2 and means for disabling said track gates whereby said power means may be energized to move said packer blade guide means upwardly along said second track leg for withdrawing said packer blade from behind such refuse when desired.

4. Mechanism according to claim 2 and means for disabling said track switches whereby said power means may be energized to move said packer blade guide means downwardly along said fourth track leg from the intersection of said fourth and first track legs when desired.

5. Mechanism according to claim 2 in which said power means is at least one hydraulic cylinder and rod, one end thereof being pivotally connected to said body and the other end thereof being operatively connected to said packer blade guide means.

6. Mechanism according to claim 2 in which said loading hopper and sidewalls constitute a tailgate that is pivotally mounted to said body and track stop means located in said fourth track legs at a level beneath said track switches and movable between a track open position for normal operation and a track closed position blocking movement of said packer blade guide means down said fourth track legs, whereby said power means may be energized to apply power through said track stop means to said tailgate for swinging said tailgate around the pivotal mounting on said body.

7. Mechanism according to claim 6 in which the pivotal connection between said body and said tailgate extends horizontally across the upper ends thereof.

8. In a refuse collecting vehicle body having a loading hopper with parallel upwardly extending sidewalls, a receiving opening at the rear of said hopper and an opening into the body at the front of said hopper, and having a packer blade for moving refuse from said hopper into said body, the improvement comprising, a first pair of generally vertical guide tracks, one in each of said sidewalls, engaging means at the upper corners of said packer blade reciprocatably mounted in said vertical guide tracks, a second pair of parallel, multisided, closed guide tracks spaced below said first pair of vertical guide tracks, one in each of said sidewalls, each of said closed guide tracks comprising a plurality of interconnected legs defined in a respective one of said sidewalls, guide means on the ends of said packer blade engaged with said closed guide tracks for guiding the movement of the lower end of said packer blade through a closed path from a front position with the lower end of said packer blade lying across the rear end of said body, thence backwardly over refuse in said hopper, thence downwardly behind such refuse, and thence forwardly through said hopper to said first position for moving refuse out of said hopper into said body, a track switch in each of said closed guide tracks, each of said track switches being located in the forward leg of said plurality of interconnected legs, said track switches being openable by said guide means moving upwardly in such forward leg, said track switch preventing movement of said packer blade guide means downwardly in such forward leg at the beginning of a rearward movement of said packer blade from the front position thereof, and power means for moving said packer blade through such closed path.

References Cited by the Examiner

UNITED STATES PATENTS 3,143,230  8/1964  Gollnick _____ 214—83.3 X

FOREIGN PATENTS 1,166,080  11/1958  France.

GERALD M. FORLENZA, *Primary Examiner.*